United States Patent
Asai

[11] Patent Number: 5,961,901
[45] Date of Patent: Oct. 5, 1999

[54] INJECTION COMPRESSION MOLDING METHOD AND INJECTION COMPRESSION MOLDING MACHINE

[75] Inventor: Ikuo Asai, Ohbu, Japan

[73] Assignee: Kabushiki Kaisha Meiki Seisakusho, Ohbu, Japan

[21] Appl. No.: 08/747,390

[22] Filed: Nov. 12, 1996

[30] Foreign Application Priority Data

Jan. 24, 1996  [JP]  Japan .................................. 8-030081

[51] Int. Cl.$^6$ .................................................. B29C 45/38
[52] U.S. Cl. ..................... 264/40.5; 264/106; 264/155; 264/328.7; 425/150; 425/553; 425/810
[58] Field of Search ..................... 264/40.5, 40.7, 264/161, 154–155, 106, 2.2, 163, 328.7, 40.1; 425/150, 553, 810

[56] References Cited

U.S. PATENT DOCUMENTS

| | | | |
|---|---|---|---|
| 3,937,779 | 2/1976 | Simmons | 264/106 |
| 4,466,934 | 8/1984 | Cane et al. | 264/106 |
| 4,707,321 | 11/1987 | Segawa et al. | 264/106 |
| 4,952,354 | 8/1990 | Yokoi et al. | 425/553 |
| 4,961,884 | 10/1990 | Watanabe et al. | 264/106 |
| 5,059,370 | 10/1991 | Kojima | 264/102 |
| 5,098,281 | 3/1992 | Kitamura | 264/154 |
| 5,238,383 | 8/1993 | Bannai | 264/40.5 |
| 5,422,061 | 6/1995 | Takahashi et al. | 264/102 |
| 5,458,821 | 10/1995 | Shimazu et al. | 264/40.5 |
| 5,472,334 | 12/1995 | Takahashi | 264/163 |
| 5,492,658 | 2/1996 | Ohno et al. | 264/161 |
| 5,512,223 | 4/1996 | Morikita | 264/161 |
| 5,516,276 | 5/1996 | Takayama et al. | 264/106 |
| 5,545,365 | 8/1996 | Asai | 264/106 |

*Primary Examiner*—Jill L. Heitbrink
*Attorney, Agent, or Firm*—Oliff & Berridge, PLC

[57] ABSTRACT

Into the cavity formed by closing a stationary mold with a movable mold, material is filled through a gate portion of a female cutter. After the material is filled into the cavity, a male cutter is advanced at a high speed from a starting position S to a vicinity position P of the female cutter, at the position P the advance speed is changed to a low speed and the male cutter advances at the low speed to an advancing limit position E to carry out the gate cutting. Then, the filled material solidifies while being cooled.

2 Claims, 2 Drawing Sheets

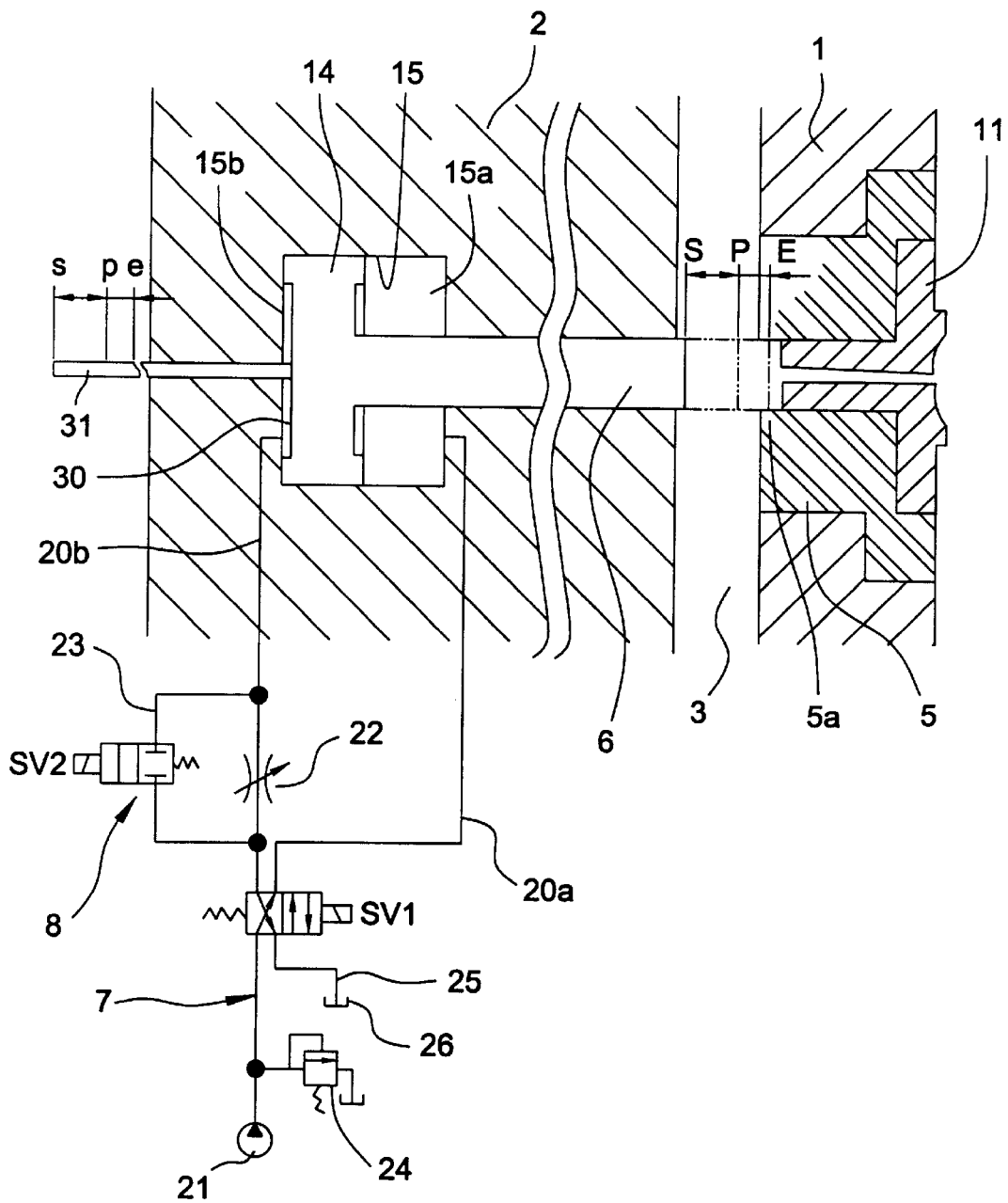

5,961,901

INJECTION COMPRESSION MOLDING METHOD AND INJECTION COMPRESSION MOLDING MACHINE

BACKGROUND OF THE INVENTION

1. Field of the Invention

The present invention relates to injection compression molding, particularly to gate sealing and prevention of occurrence of vertical burs at the time of gate cutting.

2. Description of the Prior Art

Generally, in an injection compression molding (referred hereafter to as "compression molding"), as shown in FIG. 3, molding material is filled in a cavity 3 formed by abutting a mold 2 against a stationary mold 1, and a male cutter 6 is made to advance toward a female cutter 5 to seal a gate and at the same time to pierce the center of the cavity i.e. (cutting the gate), then the filled material is kept under a compressed state and solidified while being cooled.

In such a compression molding, in order to obtain moldings in high precision, it is important for the material to be pressed rapidly before cooling and solidification. However, if the pressing of the material starts before finishing the gate sealing, the material resin leaks by backward flow out of a gate portion 5a of the female cutter 5 and a sufficient pressing of the material cannot be given resulting in insufficient copy from the molds. Because of that reason, in the conventional molding in practise, the male cutter 6 is arranged to carry out its forwarding movement at a constant and such swift speed as rapid as possible after the finishing of filling the material into the cavity 3, in order to carry out the gate sealing at such a timing as soon as possible.

However, in that conventional method, in order to carry out the gate sealing rapidly, when making the male cutter move forward at a constantly rapid speed, the material located at the portion adjacent to a gate portion 5a of a female cutter is dragged in, so that a so-called vertical bur which may arise in the direction of forwarding movement of the male cutter is apt to occur, which has caused to make a trouble in molding. And, as shown in FIG. 4, in the case where such an optical disc as represented by a compact disc D is molded as a product, if there is a vertical bur B of the disc around the opening (cut portion) C located at the center of the disc, it may cause a trouble in the engagement with a turn table T of a player.

SUMMARY OF THE INVENTION

The present invention has been made in the light of the above issues, and it is an object to provide a molding method in which a molding can be obtained in a high precision by doing a rapid gate sealing without occurrence of any vertical bur on the molding, and molding efficiency is improved, and a compression molding apparatus.

In an invention relating to a compression molding method, in order to attain the above issues, it is characterized in that, in a molding method in which a movable mold fixed on a movable base is closed in gaining access to a stationary mold fixed on a stationary base, into the thus-formed cavity 3 a molding material is filled, the male cutter advances to carry out the gate sealing and keeps the material to be compressed and held as it is, an improvement resides in making an advancing speed of the male cutter variable.

According to another aspect of the invention relating to a compression molding method, in order to attain the above issues, in the compression molding method, the advancing speed of the male cutter is arranged in such a manner as it is carried out in a high speed from the beginning of the advancing to the proximity of the female cutter, then it is turned to a lower speed.

According to still another aspect of the invention relating to a compression molding machine, in order to attain the above issues, it is characterized in that, in a molding machine in which a stationary mold fixed on a stationary base, a movable mold fixed on a movable base moving free to and fro against a stationary mold, a female cutter fixed on one mold and a male cutter fixed on another mold, which carries out a gate sealing for the gate portion of the female cutter by advancing, the advancing speed of the male cutter to the female cutter is variable.

According to a still further aspect of the invention relating to a compression molding machine, in order to attain the above issues, it is characterized in that, the advancing speed of the male cutter is arranged in such a manner as it is carried out in a high speed from the beginning of the advancing to the proximity of the female cutter, then it is turned to a lower speed.

In the present invention, an electric magnetic valve is changed in accordance with the molding conditions to control the advancing speed of the male cutter from a high speed to a low one.

That is, the gate sealing is carried out at a most appropriate timing by advancing the male cutter from the beginning of advancing to the proximity of the female cutter by controlling the advancing speed in a high speed and from where it is advanced in a low speed.

BRIEF DESCRIPTION OF THE DRAWINGS

FIG. 1 is a schematic diagram of an embodiment of a compression molding machine of the present invention.

FIG. 2 is an explanation of changing an electro-magnetic valve to control the male cutter in a compression machine shown in FIG. 1.

EMBODIMENT

Figure 3:
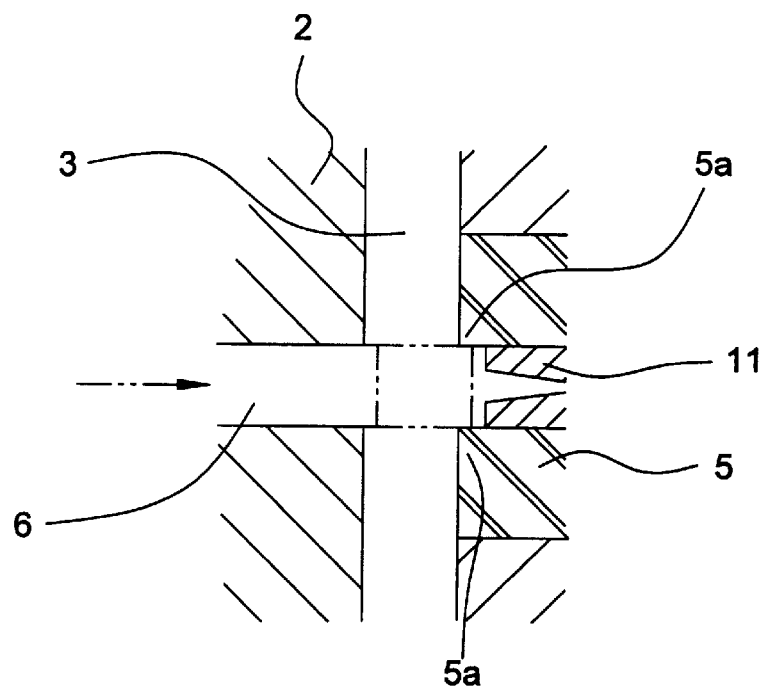
FIG. 3 is a function explanation of a conventional male cutter in a conventional compression machine.
Figure 4:
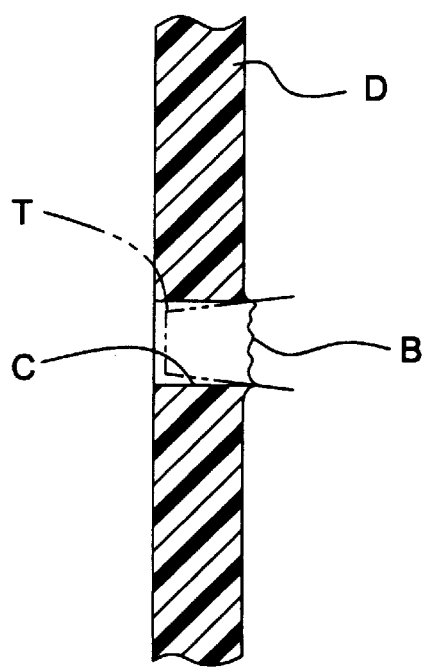
FIG. 4 is for explanation where a vertical bur is generated at the center opening of a disc when a male cutter is advanced at a given constant speed.

First, on the basis of FIG. 1, an embodiment of a compression machine of the present invention is explained. The compression machine of this embodiment comprises a stationary mold 1 fixed on a stationary base (not shown), a movable mold 2 fixed on a movable base (not shown) which is movable free to and fro against the stationary mold 1, a female cutter 5 mounted on the stationary mold 1, a male cutter 6 mounted on the movable mold 2 movably to and fro to carry out gate-sealing and gate-cutting at the central opening of the moldings by being advanced, a driving means 7 for driving the male cutter 6 to and fro and an advancing speed changing means 8 to make the advancing speed change. When both molds 1 and 2 come close and abut, a cavity 3 is formed between them.

The female cutter 5 comprises a sprue bush 11 inside the cutter concentrically which is located approximately at the center of the stationary mold 1. Opposite to the cavity 3 to which the sprue opens, on the other end of the bush 11, a nozzle (not shown) for filling the material is connected.

Approximately at the center of the movable mold 2, the male cutter 6 is disposed in order to coincide with the female cutter 5. At the proximal end (at left side of FIG. 1) of the male cutter 6, a piston 14 is provided, which is moved to and fro in a cylinder 15 provided in the movable mold 2.

As a driving device 7 for moving the male cutter 6 to and fro, it is constructed in general in such a manner as a male cutter side chamber 15a of the cylinder 15 and an opposite side chamber 15b of the cylinder 15 are supplied through a conduits 20a and 20b respectively via an electro-magnetic changing valve SV1, which are connected to a liquid pressure supply 21, and in operation, by changing the valve SV1, it can be selected to flow the liquid from the liquid pressure supply 21 to the male cutter cylinder 15a or to the opposite side chamber 15b, thereby it is changed if the male cutter 6 is to or fro. Further, as the advancing speed changing device 8 by which the advancing speed of the male cutter 6 is changed, a throttle valve 22 is interposed in the conduit 20b and, between the throttle valve 22 and the electro-magnetic changing valve SV1 and between the throttle valve 22 and the opposite side chamber 15b are connected with a by-pass conduit 23, to which an electro-magnetic changing valve SV2 is interposed for controlling to flow or stop the liquid for operation. For reference, between the electro-magnetic changing valve SV1 and the liquid pressure supply 21 a relief valve 24 is connected and at a return port of the electro-changing valve SV1 a drain conduit 25 is connected. In FIG. 1, the state where the electro-magnetic changing valve SV1 and SV2 are not generated (OFF) that is the state where the male cutter 6 moves fro, is shown.

Next, using the constitution of the compression mold thus formed, the compression molding method on the basis of FIGS. 1 and 2 is explained.

The compression molding method relating to the present invention is carried out by the following processes of filling the molding material in the cavity 3 which is formed by abutting the movable mold 2 against the stationary mold 1 through the sprue bush 11 and the gate portion 5a of the female cutter 5, and after finishing the filling of the molding material in the cavity 3, subsequently advancing the male cutter 6 toward the female cutter 5 at a high speed to the proximity position P of the female cutter 5 and from that point P the male cutter changes the advancing speed low to seal the gate, then the molding material in the cavity 3 is kept under compression pressure and solidified while cooling. In case when the filling of the material into the cavity is finished and the male cutter 6 is driven to advance at a high speed, the electro-magnetic changing valves SV1 and SV2 are generated (ON) (FIG. 2). The operational fluid from the liquid pressure supply 21 is supplied to the opposite side chamber 15b through the electro-magnetic changing valve SV1, the by-pass conduit 23 branched from the conduit 20b and the electro-magnetic changing valve SV2 changed to the supply side.

When the male cutter 6 comes close to the female cutter 5 from the advance beginning position S and advances to the given position P just before abutting the female cutter 5, in order to change the advancing speed of the male cutter 6 to a lower speed the electro-magnetic changing valve SV1 is kept in generation (ON) and the electro-magnetic changing valve SV2 is opened (OFF) to change it to the closed side. The operation fluid from the liquid pressure supply 21 is supplied to the opposite side chamber 15b from the conduit 20b in the state where a flowing amount is limited by a throttle valve 22, thereby the advancing speed of the male cutter 6 becomes low. At that time, when the male cutter 6 reaches the near position P of the female cutter 5, a resin path formed by the male cutter 6 and the gate portion 5a of the female cutter 5 becomes quite narrowed and before the male cutter 6 and the female cutter 5 abut, the resin located at that narrowed path solidifies, eventually there may be a case where the gate is sealed.

The male cutter 6 advances at a low speed until it abuts to the advance limited position E. In that slow advancing, if the male cutter advances further after the male cutter 6 abuts to the female cutter and is inserted further into the female cutter 5, a sprue portion surrounded by the male cutter 6, the female cutter 5 and the sprue bush 11 is compressed due to the pressure of the male cutter 6 to cause the liquid as the fluid to be supplied to the opposite side chamber 15b to receive the pressure, through which the pressure inside the opposite side chamber 15b is increased. However, the operation fluid is balanced with the increased pressure when it reaches a given pressure of the relief valve 24, and flows back to a tank 26 from the relief valve 24, by which the advance movement of the male cutter 6 stops.

When the gate sealing is finished, instantly the pressure increasing to the movable base starts and the molding material is pressured. When the molding procedure finished and a backward driving of the male cutter 6 is to be carried out, the electro-magnetic changing valve SV1 and the electro-magnetic changing valve SV2 are opened (OFF). The operation fluid from the liquid pressure supply 21 is supplied to the male cutter side chamber 15a through the conduit 20a via the electro-magnetic changing valve SV1. Further, the operation fluid of the opposite side chamber 15b flows back to the tank 26 from the conduit 20b through a drain conduit 25 via the electro-magnetic changing valve SV1.

For reference, as a device to detect the pre-determined approaching amount of the male cutter 6 to the female cutter 5 and decide to change the advance speed of the male cutter from a high to a low, known as the conventional manner, a detecting rod 31 is provided in such a manner as the rod 31 is projected from the movable mold 2 on the surface 30 of the opposite side chamber of the piston 14, and there are provided with many sensors (not shown) such as limit-switch, disposing sensor, vicinity sensor or magnetic scale. By detecting the disposition of the male cutter 6 from the retreated position s to the given position p, the detecting rod 31 projected from the stationary mold 2 can detect the advancing amount of the male cutter 6 from the starting position s to the female cutter 5 and the advancing to a given position p where the advancing speed of the male cutter 6 is to be changed from a high to a low. Further, as another device to detect the timing to decide to change the advance speed of the male cutter 6 from a high to a low, although figures are omitted, a timer to change the advance speed from a high to a low may be provided, which measures the time from the starting time to an expiration of a given period of time. This timer functions in such a manner as the position, where the male cutter is located when a given period time elapsed from the starting of the male cutter, is determined as a given position p which is just before the location where the gate sealing is carried out, the advancing speed of the male cutter 6 is changed from a high to a low.

According to the present invention, by making the advancing speed of the male cutter variable, the male cutter can be advanced in accordance with the molding conditions and the gate sealing can be carried out rapidly at a most suitable timing, so that the compression molding is worked appropriately to obtain mouldings in high precision and an molding efficiency is more increased.

Since the advancing speed of the male cutter is changed from an initially high speed to a subsequently low speed just before the abutting of the male cutter to the female cutter, the material adjacent the gate portion is not dragged in to prevent the occurrence of vertical bur around the cut portion of the central opening.

What is claimed is:

1. An injection compression disc molding method which uses a movable mold fixed on a movable base coming close to a stationary mold fixed on a stationary base in order to abut the movable mold against the stationary mold to form a cavity, comprising the steps of:

injecting a material to be molded into the cavity through a gate portion of a female cutter; and advancing a male cutter toward the female cutter at an advancing speed to seal the gate, the material to be molded filled in the cavity is kept in compressed state, wherein the advancing speed of the male cutter is changed during the advance, wherein the advancing speed of the male cutter is initially at a high speed from a starting point to a vicinity point of the female cutter and after the male cutter reaches the vicinity point, the advancing speed is changed to a low speed, the low speed being lower than the high speed.

2. An injection compression disc molding machine, comprising:

a stationary mold fixed on a stationary base;

a movable mold fixed on a movable base to move to and fro against the stationary mold;

a female cutter provided on one mold of the stationary mold and the movable mold;

a male cutter provided on the other mold of the stationary mold and the movable mold and is free to move to and fro against the female cutter in order to seal a gate portion of the female cutter;

a controller, wherein said male cutter moves toward the female cutter at an advancing speed, and said controller controls the advancing speed such that the advancing speed of the male cutter toward the female cutter is changed during the advance, wherein said male cutter is controlled by the controller to advance at a high speed from a starting point to a vicinity of the female cutter, and from the time when the male cutter reaches the vicinity of the female cutter, the speed of the male cutter is reduced to advance at a low speed, said low speed being lower than said high speed.

* * * * *